(12) United States Patent
Kinrot et al.

(10) Patent No.: US 8,711,245 B2
(45) Date of Patent: Apr. 29, 2014

(54) METHODS AND SYSTEMS FOR FLICKER CORRECTION

(75) Inventors: Uri Kinrot, Hod Hasharon (IL); Oded Gigushinski, Tel Aviv (IL); Shahar Kovelsky, Rehovot (IL); Noy Cohen, Stanford, CA (US)

(73) Assignee: DigitalOptics Corporation Europe Ltd., Galway (IE)

( * ) Notice: Subject to any disclaimer, the term of this patent is extended or adjusted under 35 U.S.C. 154(b) by 433 days.

(21) Appl. No.: 13/051,222

(22) Filed: Mar. 18, 2011

(65) Prior Publication Data

US 2012/0236174 A1 Sep. 20, 2012

(51) Int. Cl.
*H04N 9/73* (2006.01)
*H04N 5/217* (2011.01)

(52) U.S. Cl.
USPC ............... 348/226.1; 348/241; 348/228.1

(58) Field of Classification Search
USPC ........... 348/164, 333.01, 222.1, 226.1–228.1, 348/241
See application file for complete search history.

(56) References Cited

U.S. PATENT DOCUMENTS

| | | | |
|---|---|---|---|
| 6,710,818 B1 * | 3/2004 | Kasahara et al. | 348/607 |
| 7,164,439 B2 * | 1/2007 | Yoshida et al. | 348/226.1 |
| 7,289,144 B2 * | 10/2007 | Arazaki | 348/228.1 |
| 7,298,401 B2 * | 11/2007 | Baer | 348/226.1 |
| 7,471,316 B2 | 12/2008 | Takahashi et al. | |
| 7,538,799 B2 | 5/2009 | Yanof | |
| 7,633,533 B2 | 12/2009 | Cho et al. | |
| 7,750,949 B2 | 7/2010 | Poplin et al. | |
| 8,004,578 B2 * | 8/2011 | Chao | 348/226.1 |
| 2003/0030744 A1 * | 2/2003 | Baer | 348/370 |
| 2003/0142239 A1 * | 7/2003 | Yoshida et al. | 348/607 |
| 2005/0141047 A1 * | 6/2005 | Watanabe | 358/471 |
| 2006/0061669 A1 * | 3/2006 | Jang et al. | 348/226.1 |
| 2006/0132859 A1 * | 6/2006 | Kalapathy et al. | 358/463 |
| 2007/0085912 A1 * | 4/2007 | Hakola et al. | 348/227.1 |
| 2007/0153094 A1 * | 7/2007 | Noyes et al. | 348/226.1 |
| 2009/0115885 A1 | 5/2009 | Shabtay et al. | |
| 2009/0147103 A1 | 6/2009 | Chao | |
| 2009/0225171 A1 | 9/2009 | Shabtay et al. | |
| 2011/0255786 A1 * | 10/2011 | Hunter | 382/190 |

FOREIGN PATENT DOCUMENTS

| | | |
|---|---|---|
| WO | WO2007110097 A1 | 10/2007 |
| WO | WO2008152441 A2 | 12/2008 |
| WO | WO2010118998 A1 | 10/2010 |

OTHER PUBLICATIONS

Kinrot, U.S. Appl. No. 13/051,233, filed Mar. 18, 2011.

* cited by examiner

*Primary Examiner* — Roberto Velez
*Assistant Examiner* — Pritham Prabhakher
(74) *Attorney, Agent, or Firm* — Kilpatrick Townsend & Stockton LLP

(57) ABSTRACT

Techniques for detecting and addressing image flicker are disclosed. An imaging device that senses a distorted image and subsequently removes the distortion during processing can utilize an analysis module that obtains statistics indicative of image flicker prior to removing the distortion. An imaging device that features a diode for illuminating a field of view can utilize the diode as a photosensor to determine one or more flicker statistics to determine whether ambient lighting conditions are of the type that cause image flicker.

29 Claims, 9 Drawing Sheets

METHODS AND SYSTEMS FOR FLICKER CORRECTION

BACKGROUND

Digital imaging devices are quite popular and use a photosensor to generate an image based on light in a field of view. In addition to standalone digital cameras, digital imaging devices can be found in electronics such as mobile devices, computers, and in numerous other contexts. Because of the way photosensors operate, digital images may be subject to "flicker"—variations in the image that result due to oscillations in ambient light. The oscillations cause variations in image intensity as the photosensor is read and degrade the quality of the image (typically introducing light/dark bands) even though the oscillations are generally imperceptible to the human eye. Various techniques for addressing flicker have been proposed, but there remains room for improvement.

SUMMARY

A digital imaging device may use imaging elements to generate an image having a known distortion, such as that introduced by one or more lenses or other optical element(s), and then generate an undistorted image, in which some or all of the distortion has been removed, based on the known distortion. For example, use of the distortion may allow the device to provide zoom and/or other functionality while retaining the benefits of fixed focal-length optics. Examples discussed below present an architecture that collects flicker statistics before or during correction of the distortion and provides the statistics to the image processing element(s) subsequently handling the undistorted image so that the image processing element(s) can correct for image flicker. By separating flicker statistics gathering from flicker correction, relevant information for flicker correction that would otherwise be lost due to distortion correction can be retained to thereby improve image quality.

As an example, a device can comprise an image processing hardware element configured to receive first data representing an image that has undergone a distortion correction and second data representing a flicker statistic. The image processing hardware element can correct for image flicker according to the flicker statistic and provide output data comprising a corrected, undistorted image. For example, the image processing hardware element may comprise one or more processors implementing image signal processing to perform typical image enhancements and adjustments which, based on the flicker statistic(s), calculate a flicker frequency and send a suitable correction command (e.g., an adjustment of the sensor integration time) to the sensor.

These examples are discussed not to limit the present subject matter but to provide a brief introduction. Additional examples are described below in the Detailed Description. Objects and advantages of the present subject matter can be determined upon review of the specification and/or practice of an implementation according to one or more teachings herein.

BRIEF DESCRIPTION OF THE DRAWINGS

A full and enabling disclosure is set forth more particularly in the remainder of the specification, which makes reference to the following figures.

DETAILED DESCRIPTION

Figure 1:
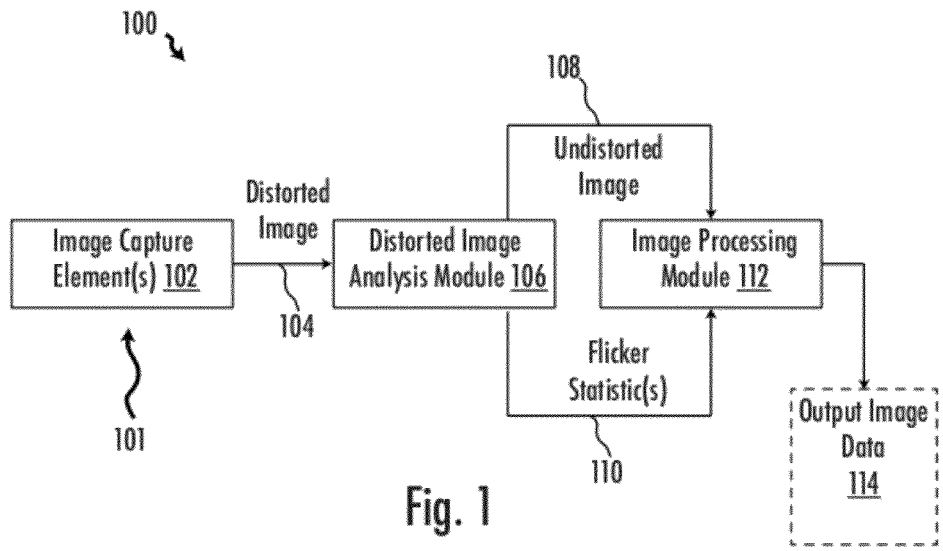
FIG. 1 is a diagram showing an example of an architecture that derives one or more flicker statistics before or during generation of an undistorted image.

Example implementations will now be described more fully hereinafter with reference to the accompanying drawings; however, they may be embodied in different forms and the present subject matter should not be construed as limited to the examples set forth herein. Rather, these examples are provided so that this disclosure will be thorough and complete, and will fully convey the present subject matter to those skilled in the art.

Examples of Using Intentionally-Distorted Images

In some implementations, an optical zoom may be realized using a fixed focal-length lens combined with post processing for distortion correction. Commonly assigned, co-pending PCT Application Serial No. EP2006/002861, which is hereby incorporated by reference, discloses an image capturing device including an electronic image detector having a detecting surface, an optical projection system for projecting an object within a field of view (FOV) onto the detecting surface, and a computing unit for manipulating electronic information obtained from the image detector. The projection system projects and distorts the object such that, when compared with a standard lens system, the projected image is expanded in a center region of the FOV and is compressed in a border region of the FOV. For example, the resolution difference between the on-axis and peripheral FOV may be between about 30% and 50%. This effectively limits the observable resolution in the image borders, as compared to the image center.

For additional discussion, see U.S. patent application Ser. No. 12/225,591, filed Sep. 25, 2008 (the US national phase of the PCT case PCT/EP2006/002861, filed Mar. 29, 2006) and Ser. No. 12/213,472 filed Jun. 19, 2008 (the national phase of PCT/IB2007/004278, filed Sep. 14, 2007), each of which is incorporated by reference herein in its entirety.

A computing unit (e.g., one or more controllers, processors, or other electronic circuitry in the image processing chain) may be adapted to crop and compute a zoomed, undistorted partial image (referred to as a "rectified image" or "undistorted image" herein) from the projected image, taking advantage of the fact that the projected image acquired by the detector has a higher resolution at its center than at its border region: Multiple zoom levels can be achieved by cropping more or less of the image and correcting for distortion as needed. Additionally or alternatively, some or all of the computation of the undistorted image can be handled during the process of reading sensing pixels of the detector as disclosed in Application PCT/EP2010/054734, filed Apr. 9, 2010, which is incorporated by reference herein in its entirety.

The present inventors have discovered that distortion correction, such as distortion correction for large-distortion lenses, can degrade the performance of conventional anti-flicker mechanisms included in image signal processing (ISP) modules. Accordingly, examples discussed below split the anti-flicker mechanism into two parts: a first part that collects flicker statistics and a second part that determines the corresponding correction command. The flicker statistics can be derived in a way so that anti-flicker performance in the ISP is not degraded. It will be understood that this approach can be used regardless of the ultimate purpose of distortion correction.

The present specification refers to an "undistorted image" and distortion "correction," but it will be understood that a perfectly undistorted image and/or perfect correction need not be achieved. Thus, the "undistorted image" should be understood to also include images with some residual distortion or residual effects thereof, and "correction," such as when a distorted image undergoes a correction, should be understood to include cases in which some, but not necessarily all, of the effects of the known distortion are removed.

FIG. 1 is a diagram showing an example of an architecture 100 that derives one or more flicker statistics before or during generation of an undistorted image. For example, architecture 100 can be implemented in an imaging device, such as a standalone imaging device like a digital still or video camera, or in an imaging device integrated into (or configured for integration into) a computing device such as a mobile device (e.g., phone, media player, game player), a computer or peripheral (e.g., laptop computer, tablet computer, computer monitor), or any other device. In this example, light 101 is captured from a field of view via image capture elements 102, which can include light-sensing elements and one or more optical elements that introduce a known distortion into the image. For example, the light-sensing elements may comprise an array of pixels, such as pixels of a CMOS or other detector.

As shown at 104, the image capture elements provide data 104 representing a distorted image to a distorted image analysis module 106. Distorted image analysis module 106 is interfaced to the array of image sensing elements of capture elements 102 and is configured to generate first data 108 representing an undistorted image based on correcting for a known distortion of distorted image 104. For instance, distorted image analysis module 106 may comprise circuitry configured to correct for the distortion by generating a row of pixels of the undistorted image 108 based on identifying pixels spread across multiple rows of the distorted image 104 due to the known distortion. Distorted image analysis module 106 may do so via an algorithm to identify the pixels spread across multiple rows and/or via circuitry that reads the array of image sensing elements along trajectories that correspond to the distortions.

In any event, distorted image analysis module 106 provides first data 108 representing the undistorted image along with second data 110 representing one or more flicker statistics to image processing module 112, which represents one or more hardware elements that implement additional image signal processing (ISP) functions to generate output image data 114. Output image data 114 can comprise still or video image data. For example, in some implementations the distorted image is in Bayer format and the undistorted image is provided in Bayer format, with the ISP functions including conversion of the Bayer image to output image data 114 in another format for use by an application. Other examples include correction of exposure and other image characteristics.

In this example, image processing module 112 can also correct for the effects of flicker based on flicker statistic(s) 110. For example, in some implementations flicker statistics 110 can be used to determine a flicker frequency and/or other parameters that are used by image processing module 112 to determine a feedback command to provide to the image capture elements 102. However, in additional implementations, flicker correction can be handled elsewhere, such as by distortion analysis module 106 directly based on statistics gathered by distortion analysis module 106.

Figure 2:
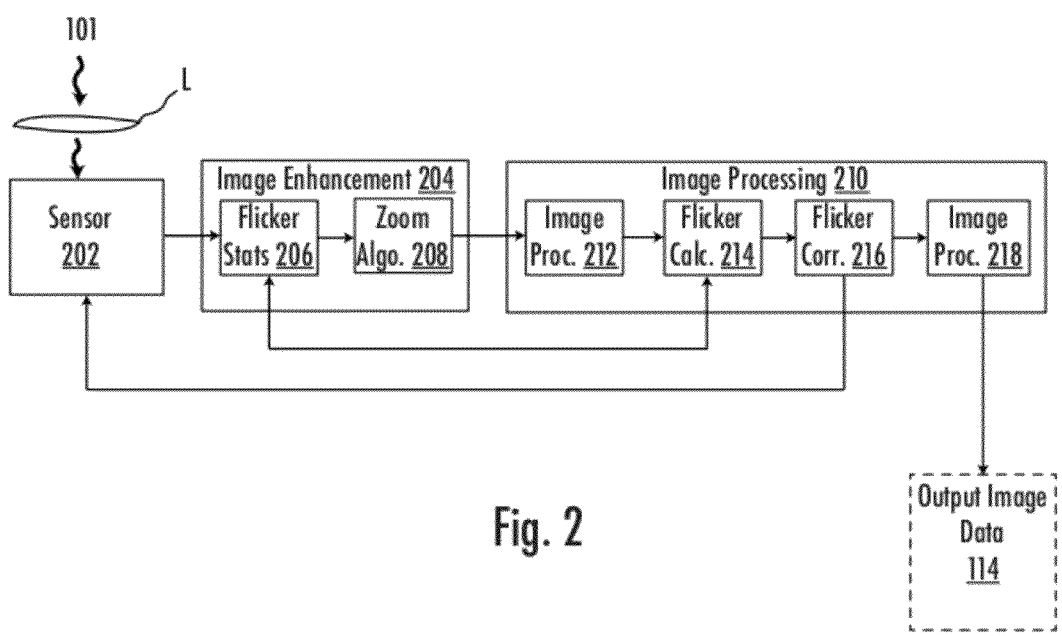
FIG. 2 is a diagram showing details of an illustrative architecture that derives flicker statistics before generation of an undistorted image and provides the statistics to an image signal processing module that subsequently corrects for flicker.

FIG. 2 is a diagram showing details of an illustrative architecture that derives flicker statistics before generation of an undistorted image and provides the statistics to an image signal processing module that subsequently corrects for flicker. In this example, light 101 passes through one or more lenses L which represent the optical element(s) that introduce the known distortion. In some implementations, the optical element(s) comprise fixed focal-length optics, with the distortion utilized to provide different zoom levels by cropping the distorted image in image enhancement module 204 by varying amounts and correcting for the distortion through use of a zoom algorithm 208, with zoom algorithm 208 configured in accordance with the patent application documents incorporated by reference above. Thus, image enhancement module 204 corresponds to distortion analysis module 106 of FIG. 1, above. However, as noted above the distortion may be utilized for any purpose.

Image enhancement module 204 also includes a flicker statistics component 206 representing software or circuitry that generates one or more flicker statistics based on the distorted image received from sensor 202. In this example, the resulting flicker statistics can be provided to a flicker calculation component 214 of image processing module 210 (corresponding to image processing module 112 of FIG. 1).

In this example, image processing module 210 implements image processing functions 212 and 218 along with flicker calculation function 214 and flicker correction function 216. Each function may be implemented as software (e.g., algorithms carried out by a processor of image processing module 212) and/or via hardware circuitry that implements logical operations according to the algorithms or directly. The image processing functions 212 and 218 shown here are for purposes of context to represent typical processing operations carried out based on the undistorted image data.

Thus, image processing module 210 receives the undistorted image produced by image enhancement module 204 along with flicker statistics. Image processing functions 212, 218, and/or other functions are carried out to provide output image 114. Based on the flicker statistics, flicker calculation function 214 determines the amount and nature of flicker and flicker correction function 216 takes appropriate action to address the flicker. For example, flicker correction function can determine an appropriate command to provide, to sensor 202 to reduce the effects of flicker. Additionally or alternatively, flicker correction function 216 can filter or otherwise manipulate the image (and/or invoke other image processing functions) to correct for flicker present in the image. The flicker statistic(s) can be stored and passed between image enhancement module 204 and image processing module 210 (or from module 106 to module 112 of FIG. 1) in any suitable way and examples are discussed below.

Figure 3:
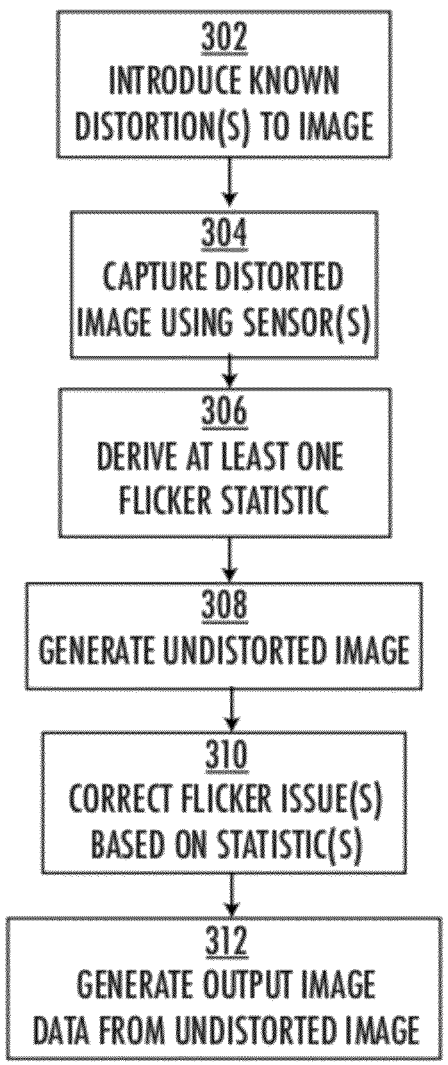
FIG. 3 is a flowchart showing an illustrative method for flicker correction in digital images.

FIG. 3 is a flowchart showing an illustrative method 300 for flicker correction in digital images. Block 302 represents introducing a known distortion to an image. This can occur, for example, by allowing light from a field of view to pass through or otherwise interact with lenses, mirrors, and/or other optical elements that distort the image according to a known distortion function. At block 304, the distorted image is captured using one or more sensors. Any suitable image sensing technology can be used including, but not limited to, CMOS and other photodetector technologies.

Block 306 represents deriving at least one flicker statistic. This can be carried out, for example, by distortion analysis module 106 of FIG. 1 and/or image enhancement module 204 using flicker statistics component 206. Any suitable technique can be used to determine one or more flicker statistics, as noted in the examples below. Generally, the flicker is a phenomenon that occurs along the rolling shutter dimension, i.e., along the image height. Thus, the flicker statistic(s) can comprise any information indicating the characteristic variation of intensity over the image height that can be passed to the image processing components to analyze. For example, the flicker statistic(s) can comprise the type of statistics the ISP would ordinarily derive on its own from the undistorted image.

Note that the description of flicker phenomenon as occurring along the rolling shutter dimension and image height is for purposes of explanation only and is not intended to be limiting. Embodiments according to the teachings discussed herein can be used regardless of how the flicker phenomenon originates in a particular case, or regardless of how the flicker phenomenon presents itself in the distorted image so long as one or more flicker statistics usable to correct for the flicker can be derived.

Line Averaging or Summation

In some cases, deriving the flicker statistic(s) comprises averaging a plurality of pixel values along a line of pixels in the distorted image. In order to keep the logic size small, it can be preferable to either sum the pixel values along the line (without division), or use line averaging length that is a power-of-two to replace the division by truncating least significant bits from the sum. This can be summarized in the following equations:

$$S[v] = \sum_{h=0}^{iw-1} P[h, v] \quad \text{or} \quad \text{Equation 1}$$

$$A[v] = \frac{1}{iw} \sum_{h=0}^{iw-1} P[h, v] \quad \text{Equation 2}$$

Where S is the sum, A the average, P the pixel value (of the pixel type used for the flicker detection), v the line index in the frame, h the pixel index in the line and iw is the image width.

Multi-Area

In some implementations, deriving the flicker statistic(s) comprises dividing the distorted image into a plurality of areas and deriving a flicker statistic for each area. The flicker statistics from each area can later be compared by the ISP or other component(s) that actually decide whether flicker is present. For example, the image can be divided to a few vertical areas, configured by the user during design/setup of the imaging architecture. This means that there will be a few line average or summation values per input line, as follows:

$$S_n[v] = \sum_{h=H_n}^{H_n+L_n-1} P[h, v] \quad \text{or} \quad \text{Equation 3}$$

$$A_n[v] = \frac{1}{L_n} \sum_{h=H_n}^{H_n+L_n-1} P[h, v] \quad \text{Equation 4}$$

Where $H_n$ is the starting point of area n and $L_n$ is the horizontal length of area n. Note that for Bayer coded images, the $L_n$'s should preferably be even numbers, and preferably powers of 2.

Decimation

In some implementations, deriving the flicker statistic(s) comprises decimating the distorted image according to an intended size of the undistorted image, the intended size different from a size of the distorted image. In order to reduce the amount of data, averaging and decimation can be performed along the vertical dimension of the image, as follows:

$$S_{n,m} = \sum_{v=V_m}^{V_m+G_m-1} \sum_{h=H_n}^{H_n+L_n-1} P[h, v] \quad \text{or} \quad \text{Equation 5}$$

$$A_{n,m} = \frac{1}{G_m L_n} \sum_{v=V_m}^{V_m+G_m-1} \sum_{h=H_n}^{H_n+L_n-1} P[h, v] \quad \text{Equation 6}$$

Where $V_m$ is the starting point of vertical decimation section m and $G_m$ is its height. Note that the $G_m$'s should preferably be even numbers, and preferably powers of 2. It is also recommended that the cover all the vertical dimension of the image, that $V_{m+1}=V_m+G_m$ and that the $G_m$'s are the same size (i.e., for all m, $G_m=G$). The decimation should be set according to the size of the output image so that the sample rate in the vertical dimension is much larger than the number of flicker cycles apparent or expected in the image.

These examples of flicker statistics are not intended to be limiting, and other information relevant to flicker analysis can be adapted for use at block 306. Generally speaking, the flicker statistics can represent any type of information describing whatever type of flicker is exhibited in the distorted image.

Figure 4:
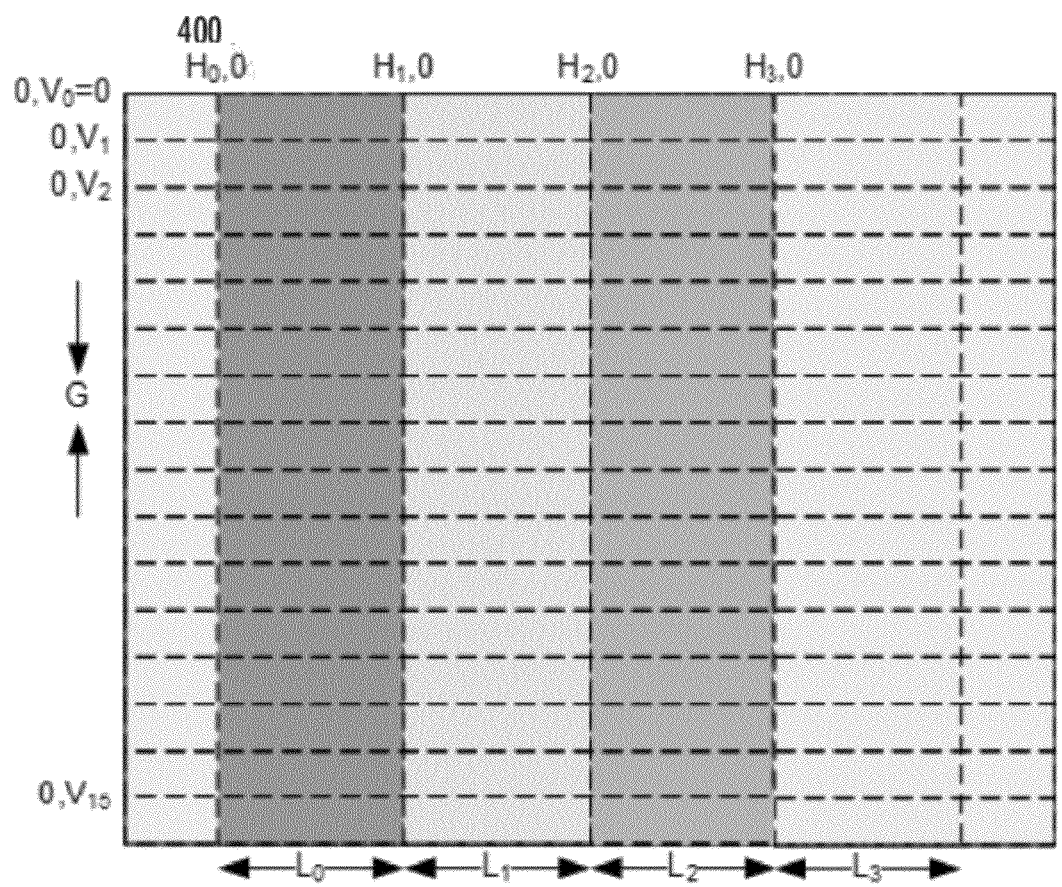
FIG. 4 is a pixel diagram illustrating an example of deriving a flicker statistic.

Next, an example of deriving a flicker statistic will be discussed along with FIG. 4. In particular, some implementations use a combination of line-averaging, multi-area, and decimation. As shown here, the undistorted image is divided into four areas L0, L1, L2, and L3. Areas along the left and right edges of the image are ignored in this example. Although the areas are contiguous in this example, non-contiguous area could be used.

Rows of the image have been decimated according to Equations 5/6 above. Then, within the decimated rows, line averaging can be performed according to Equations 1/2 above. Within each area, flicker information is collected so that the results for each area can be compared. In some implementations, the distorted image is in Bayer format.

At block 306, it can be advantageous to perform summation and/or other statistics derivation on all pixels, irrespective of color, and to use areas with even width and decimation averaging with even height. This can simplify implementation and provide results similar to what would be achieved when working with image intensity. However in some implementations, pixels of a particular color or colors of the image sensor can be omitted from he statistics. For example, for Bayer image sensors, it may be preferable to use only the pixels of the green color for flicker statistics.

After the flicker statistic(s) are derived, they can be stored at a location accessible by the component(s) that handle flicker correction (e.g., module 112, 210) and/or provided without prior storage to the component(s) that handle flicker correction. For instance, the flicker statistic(s) can be relayed using some or all of the same connections used to relay image data (e.g., the image bus). Additionally or alternatively, flicker statistic(s) can be relayed over dedicated data lines and/or the flicker statistic(s) can be relayed over a shared bus.

The storage and output of the flicker statistic data depends on how the statistic is derived, such as the type of line averaging used, the number of areas if multiple areas are used, and the extent of decimation. In some implementations, 16-bit unsigned words are used to store the 16 most significant bits of the line averaging result (e.g., 10 integer bits and 6 fractional bits) in register or other memory of the image enhancement module 204. The 10 most significant bits can be passed to image processing module 210 over an image bus.

For storage, a one-dimensional array can provide effective combinations of multiple areas and decimations. Two example use cases are noted below:

| Factor type | Case 1 | Case 2 |
|---|---|---|
| Number of areas | 2 | 4 |
| Number of samples along the vertical dimension | 64 | 32 |
| Number of bytes for each stored value | 2 | 2 |
| Total | 2*64*2 = 256 bytes | 4*32*2 = 256 bytes |

For instance, as noted above the flicker statistic(s) can be transferred on the image bus, in parallel with or serial to the undistorted image. The undistorted image is typically smaller than the distorted image, and so some bits on the image bus can be used to transfer the flicker statistic(s). When data is added to the image bus, the level of decimation should ensure that all data for the corresponding frame is transmitted.

Three particular examples of transferring the flicker statistic(s) are noted below. For examples (2) and (3), the ISP may require firmware and/or hardware adaptations to be able to read and use the information.

(1) PC (Inter-Integrated Circuit) Access:

The ISP reads the flicker statistic(s) data from the chip I²C address space. The auxiliary data is kept in memory, in registers, or other machine-readable storage, depending on area considerations. For instance, if the ISP would ordinarily develop the flicker statistics on its own, the flicker statistics as provided to the ISP can be stored at the expected location of the ISP's own flicker statistics.

(2) Embedded Data Lines in SMIA or MIPI:

The flicker statistic(s) data is embedded in embedded data lines of the architecture as defined by SMIA (Standard Mobile Imaging Architecture) or MIPI (Mipi Alliance). In some implementations it is better to use the footer embedded lines instead of the header lines, as otherwise the information to the ISP will represent the flicker in the previous frame.

Manufacturer-Specific Data in SMIA or MIPI:

The flicker statistic(s) data is embedded as pixels of the image, flagged as manufacturer specific pixels. It can be embedded in additional lines (preferably footer lines) or in columns. When embedding pixels, image scaling should be carefully considered.

Turning back to FIG. 3, block 308 represents generating the undistorted image and can be carried out, for example, by distorted image analysis module 106 of FIG. 1 and/or image enhancement module 204 of FIG. 2. As noted above, the image has been distorted according to a known distortion function and, accordingly, the distortion function can be used to generate the undistorted image. For example, rows of the distorted image can be read into buffer memory, where one or more rows of the undistorted image are spread across multiple rows of the distorted image. The rows of the undistorted image can be calculated based on the curves of the distortion function. Additionally or alternatively, the rows of the distorted image can be identified by reading pixels of the sensor along trajectories that correspond to the distortion function.

Block 310 of FIG. 3 represents correcting flicker issues based on the flicker statistic(s). Block 310 can be carried out by image processing module 112 of FIG. 1, image processing module 210 of FIG. 2, for example. In some implementations, block 310 is carried out by distorted image analysis module 106 or image enhancement module 204.

In any event, block 310 can comprise sending a feedback signal to the imaging components to reduce the effects of flicker. For example, the sensor exposure time can be increased or decreased. Additionally or alternatively, the image itself can be subjected to filtering or other operations to remove or reduce artifacts due to flicker.

The acts taken to reduce flicker can correspond to those taken in conventional image signal processing systems—e.g., adjusting exposure time to the illumination modulation. However, in contrast to conventional systems, the acts taken to reduce flicker are based on statistics from the distorted image. For example, based on the flicker statistic(s), a flicker frequency and magnitude can be calculated and the sensor exposure time adjusted to reduce or eliminate the effects of flicker at that frequency.

As one example, the statistics from the line averaged/decimated distorted image can be subjected to frequency or period detection analysis. As an example, a discrete Fourier transform (DFT) can be used, or peak detection or zero-crossing detection techniques can be used to identify the flicker period. Low-pass filtering, identification of false peaks, and other filtering techniques can be used to differentiate between signals from objects in the frame and signals due to flicker.

The flicker analysis can also consider intensity. For instance, the energy in potential flicker frequencies can be compared amongst the potential flicker frequencies and also to the energy in non-flicker frequencies. If, for example, energy in one potential flicker frequency is higher than the others, that frequency may be selected as the most likely flicker frequency. If the energy in non-flicker frequencies is considered, the flicker frequencies may be compared against the average energy in the non-flicker frequencies to identify which (if any) have meaningful energies, while ignoring outlier frequencies (if any).

Block 312 represents generating output image data from the undistorted image. This can be carried out, for example, by module 112 of FIG. 1 and/or module 210 of FIG. 2. The output image data can be generated by applying one or more image processing techniques to the undistorted sensor data to render the image in a suitable format. For example, if the undistorted sensor data is provided in Bayer format, then block 312 can comprise demosaicing the Bayer image to RGB format. Other image processing operations can occur as well, such as scaling brightness values of the colors, adjusting the RGB values according to a color profile, and post-processing the data to address highlights, sharpness, saturation, noise, etc.

If needed, block 312 can also comprise converting the data to a particular file format (TIFF, JPEG, MPEG, etc.) and storing the data in a nontransitory computer-readable medium. Although in this example generating the output image comprises performing additional image processing operations, in some implementations block 312 may represent only storing the raw output of the undistorted image in a computer-readable medium for subsequent processing by another component, relaying the raw or converted data via an internal or external connection for further analysis, or converting the output data to another file format for storage.

Additional Details Regarding Flicker

Figure 5:
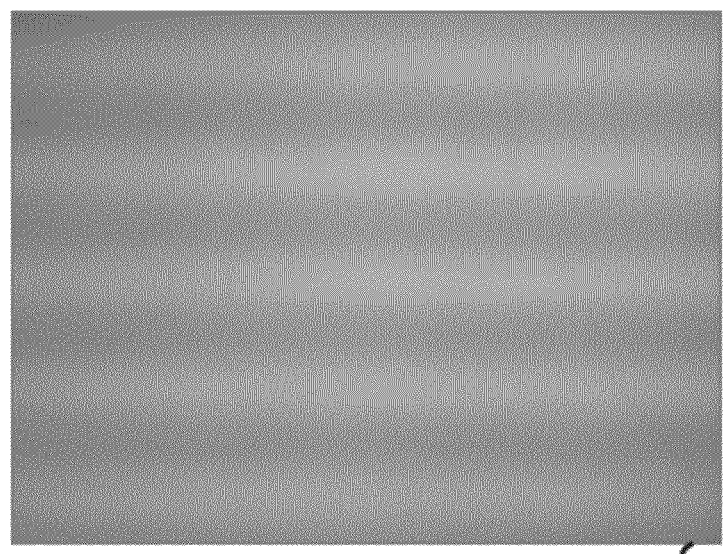
FIG. 5 is an example of an image uncorrected for flicker.

FIG. 5 is an example of an image uncorrected for flicker, particularly an image for a sensor with exposure time of 15 msec, frame scan time of approximately 50 msec, and AC line frequency of 50 Hz with fluorescent light illumination. As can be seen here, due to the variations in intensity of light due to the AC line frequency, the image has dark and bright bands alternating in the vertical direction. As discussed below, by understanding the cause of the flicker, suitable corrective action can be taken by an imaging system such as those discussed herein.

Flicker is a phenomena caused by the combination of sampling an image over a time interval (i.e., not sampling all pixels of a frame at once, such as when a rolling shutter is used in CMOS sensors) and the oscillating light intensity of artificial light when the image is sampled, for example light with oscillations due to power line voltage modulation. Flicker is particularly visible under fluorescent lights as the intensity modulations of these light sources are large.

Flicker can be explained as follows: the AC power line that drives the artificial light source modulates with a typical frequency of 50 Hz or 60 Hz, depending on the location (country). This causes the illumination to modulate at a frequency of 100 Hz or 120 Hz, respectively (since the illumination is the same for both the positive half and the negative half of the AC cycle). When a rolling shutter mechanism is used, each pixel starts to integrate the photocurrent at a different phase relative to the cycle of illumination. This causes modulation of the pixel intensity unless the integration time is an integer multiple of the illumination cycle time. If the exposure time is an integer multiple of the illumination frequency then each pixel integrates an integer number of complete cycles of light, irrespective of the phase of its exposure relative to the light cycle. Deviation of the exposure time from an integer number of illumination cycles causes flicker bands to appear on the image.

Figure 6A:
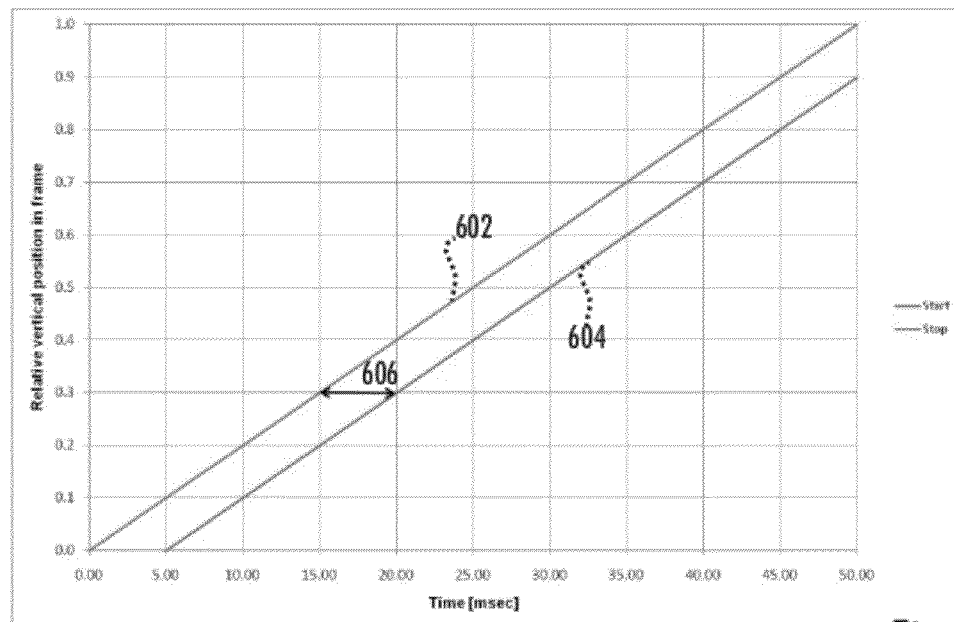
FIGS. 6A-6E are charts illustrating how flicker is introduced into digital images.

FIG. 6A shows an example of a frame with a rolling shutter scan time of 50 msec (i.e., frame rate of 20 Hz if the vertical blanking time is negligible). The frame lines are represented along the vertical axis as relative image height. The start and stop points for each position along the frame height are marked by lines 602 (start) and 604 (stop). For convenience, the time scale is shown from the start time of pixel exposure. For a specific pixel, the integration of photocurrent occurs from the Start time to the Stop time for that pixel height. In this example, exposure time is 5 msec and pixels located on the line at 0.3 of the total image are exposed from t=15 msec to t=20 msec, as indicated by the double-arrow at 606.

Figure 6B:
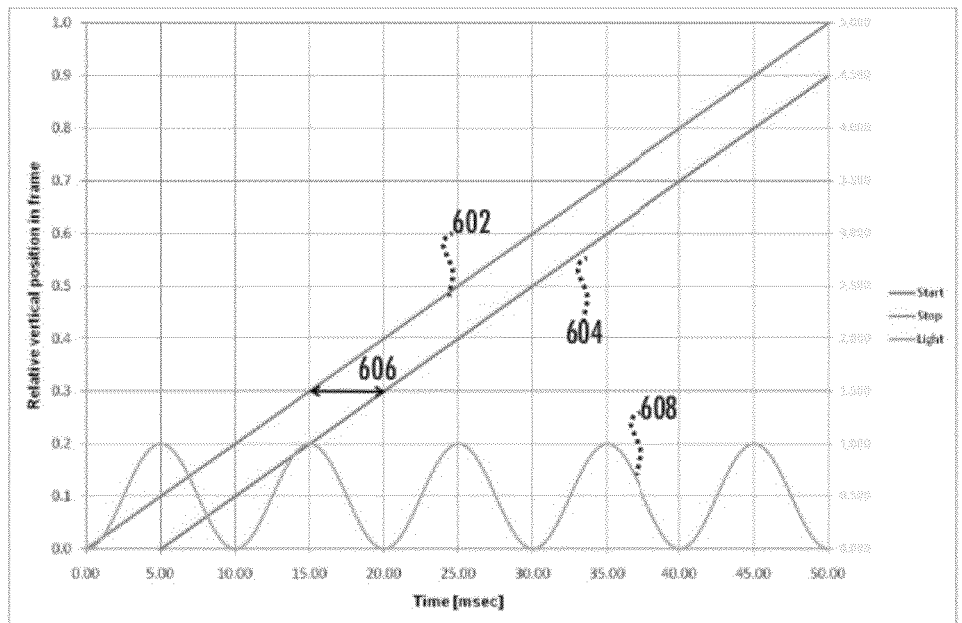

FIG. 6B shows the rolling shutter of FIG. 6A and adds to it a modulated illumination with AC frequency of 50 Hz (i.e., illumination modulation frequency of 100 Hz, or cycle time of 10 msec) as shown at 608. For simplicity, an ideal raised sinusoid is used for the illumination intensity change over time. However, for real light sources the pattern is more complex. The exposure of the pixels at 0.3 of the image height starts at the peak of illumination intensity (t=15 msec) and stops at the minimum intensity (t=20 msec). The photocurrent is thus integrated during one half of the illumination cycle.

Figure 6C:
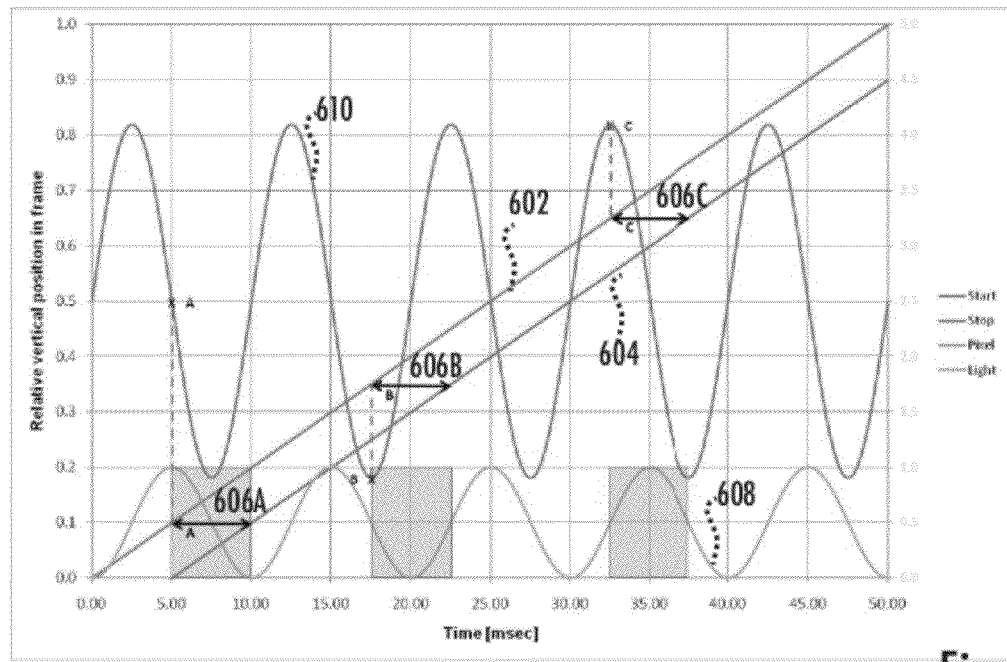

The outcome of the pixel integration is shown in FIG. 6C. The resulting pixel intensity is shown at 610 in relative scale, where the average intensity is set to 0.5. For pixels at 0.1 of the image height (case 606A), the exposure starts from the peak intensity and ends at the minimum intensity. Thus, the resulting pixel intensity is the same as the average. The exposure of case 606B is symmetrically placed around the minimum illumination intensity, and therefore results in the minimum pixel intensity (but not zero, as the illumination intensity is zero only at t=20 msec for case 606B). Case 606C is similar to case B but centered around the maximum illumination at t=35 msec. The shaded rectangles show the integration periods of the illumination for cases 606A, 606B, and 606C.

Figure 6D:
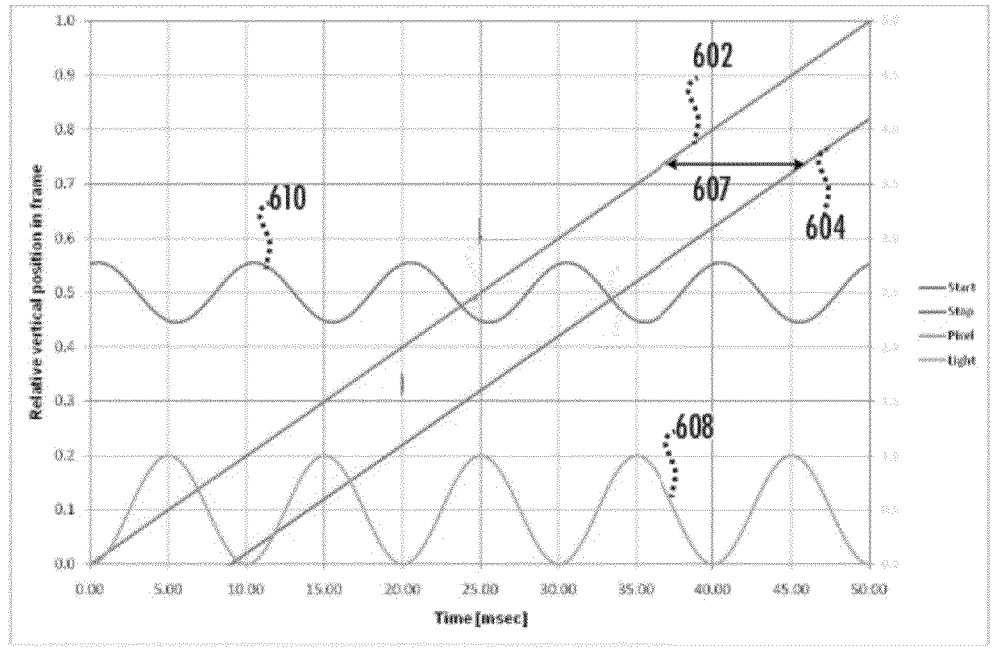
Figure 6E:
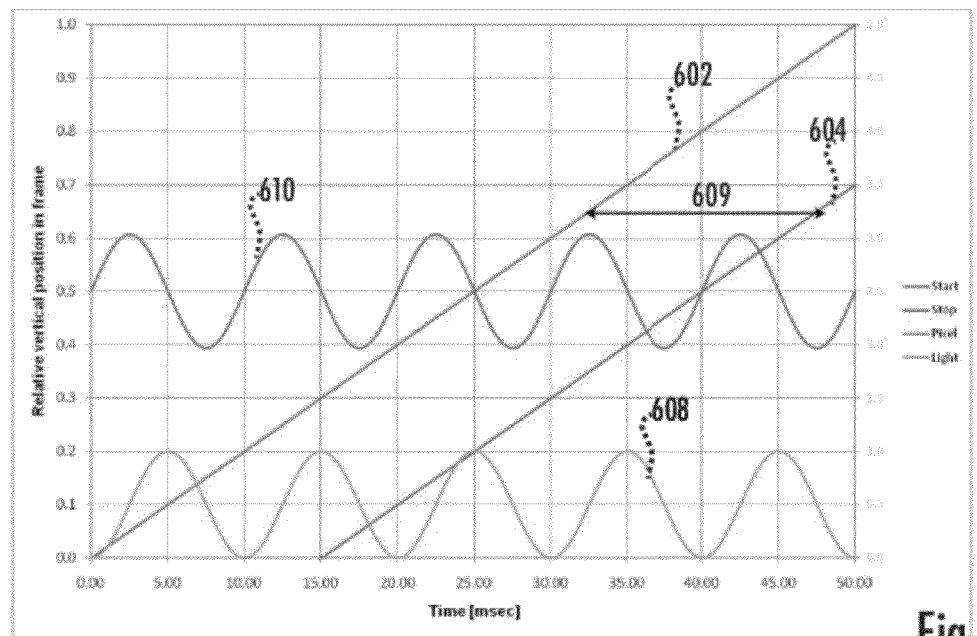

Increasing the exposure to 9 msec (90% of the illumination cycle time), reduces the modulation depth of the pixel intensity flicker, as shown at 607 (increased exposure time) and 610 (reduced variation in intensity) in FIG. 6D. Flicker is also apparent when the exposure time is larger than the illumination cycle but is not an integer multiple of it, as shown in FIG. 6E for exposure time of 15 msec (150% of the illumination cycle time) as shown at 609. In FIG. 6E, pixel intensity variations have increased as shown at 610.

Thus, it can be seen that adjusting the exposure based on the flicker frequency can reduce the flicker effect. As mentioned above, though, imaging devices may utilize distortion to provide enhanced images with fixed focal-length optics. For example, image enhancement (e.g., that of modules 106, 204) may be implemented as stand-alone chip that manipulates distorted Bayer image data and provides undistorted Bayer image data to the ISP for further processing. This may adversely influence the capability of the ISP to perform its flicker detection on the input images, since the ISP cannot analyze the original sensor image and the distortion removal process changes substantial characteristics of the image with regard to flicker detection.

Specifically, flicker detection mechanisms are based on the assumption that the flicker phase is virtually fixed along the image lines. This is utilized for integration of pixel values along the image lines and for decisions based on the correlation of the phase of flicker in different parts of the image. However, the distortion correction mechanism causes the flicker lines to bend (together with bending the distorted outside-world image), and the flicker lines would no longer be straight horizontal. The effect on the flicker detection processing depends on the characteristics of the processing, image and zoom. For slow frame rate and low zoom factors, and for processing that integrates along whole lines, the effect on detection may be severe. For fast frame rate, high zoom factors or integration limited to a small horizontal portion of the image, the effect is smaller and may possibly be tolerated.

Additionally, the number of lines in the undistorted output image is different from that of the input image according to the zoom mode. This may affect the determination of the flicker frequency unless taken into account in the ISP processing or unless the processing does not depend on the line index as scaling of the time domain. The scaling problem can be solved by taking the zoom scaling into account in the flicker processing. However, this would normally require adaptation of the ISP flicker detection firmware code. Thus, rather than requiring substantial modifications to ISP components, the flicker statistic(s) are derived from the distorted image and passed to the ISP along with the undistorted image so that the ISP's flicker correction capabilities can be utilized with minimal or no modification.

Hardware-Based Flicker Detection

In some implementations, flicker can be detected based at least in part on sensor inputs. This can allow for flicker detection irrespective of camera image content. For instance, flicker can be detected even before the start of image streaming from the image sensor and without modifying the exposure time. This can be achieved by determining if ambient lighting conditions are of the type that will cause flicker in an image.

For example, if the integration time is set to a multiple of the flicker cycle (in case it is the optimal exposure time with respect to image illumination intensity), then it is impossible to check the existence of flickering illumination based on the image content without changing the exposure time and actually causing the flicker to appear. This is especially problematic during video recording. If the scene illumination is changed such that the exposure should be changed but the current exposure time is a multiple of the flicker cycle time, then changing the exposure involves the risk of introducing flicker into the video recording. With independent hardware flicker detection, flickering illumination is determined irrespective of the exposure time and can provide the necessary information for the exposure control logic.

Figure 7:
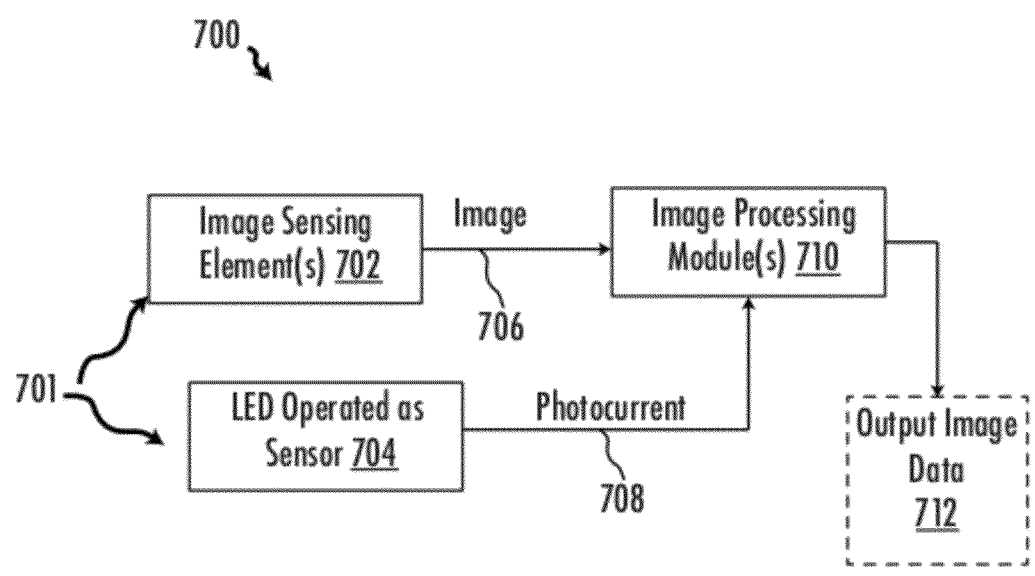
FIG. 7 is a diagram showing an example of an architecture for detecting flicker through use of an illumination element in a device.

FIG. 7 is a diagram showing an architecture 700 in which an LED or other component that can direct energy into a field of view is operated as a sensor. As shown in FIG. 7, light 701 from a field of view is imaged using image sensing elements 702 (e.g., a photodetector) but also by an LED 704 operated as a sensor. For instance, an LED may be operated as a sensor by including suitable circuitry in a device to sample a photocurrent produced when the LED is deactivated. Image data 706 can be provided along with photocurrent 708 to an image processing module 710 (e.g., ISP components) that provide output image data 712.

In this example, the LED obtains light from the same field of view as the image sensing elements 702. However, in some implementations, another LED that directs light outside the device and is exposed to ambient light can be used. For instance, an imaging device may include one or more LEDs at an external surface to provide status information and other output and one or more of such LEDs can be operated as photosensors for flicker detection purposes.

Using an independent sensor to detect flicker has a beneficial side effect: by analyzing the waveform or spectrum of the detected illumination, the type of illumination can be detected automatically (e.g., differentiate between incandesce and fluorescent illumination, and even identify compositions of light sources). This can be useful for color correction, lens shading correction, white balance, and auto exposure mechanisms within the ISP.

Addition of a separate photodiode and optics for hardware-based flicker detection may affect the cost of the camera system as well as have mechanical implications. However, in camera systems that are already equipped with LED-based flashes, spotlights, or other illumination components, the LED itself may be used (when it is turned off) as a light sensitive device instead of a dedicated photodiode. Although a LED is less efficient than a photodiode in converting incident light to photocurrent, it may still be useful for flicker detection due to the low frequencies involved (thermal noise power is low compared to the signal level).

Figure 8:
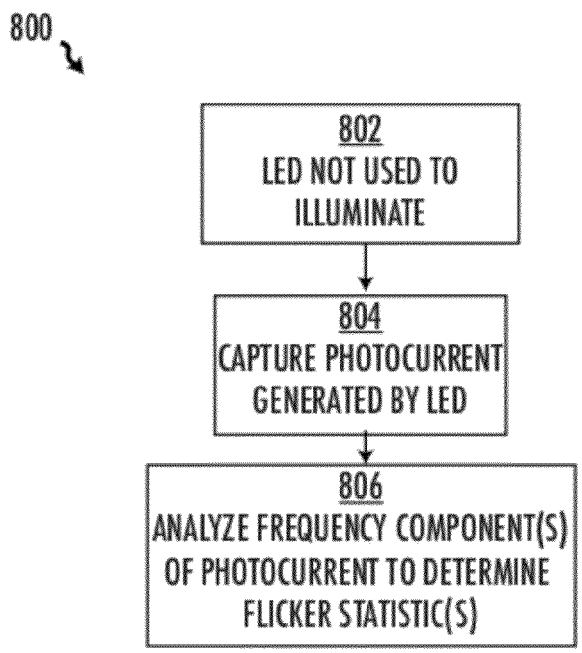
FIG. 8 is a flowchart showing an illustrative method of detecting flicker through use of an illumination element in a device.

FIG. 8 is a flowchart showing an illustrative method 800 of detecting flicker through use of an illumination element in a device. For example, method 800 can be carried out by hardware circuitry comprised in a still or video camera, computer, mobile device, or some other device. Block 802 represents entering a state in which the LED is not used for illumination. For example, a command may be provided to switch off the LED or its power source may be interrupted. Block 804 represents capturing the photocurrent generated by the LED in its off state. For instance, the current generated by the LED can be sampled using an analog-to-digital converter as noted in the example below.

Block 806 represents analyzing one or more frequency components of the photocurrent to determine whether the ambient lighting is of the type that will induce image flicker. This can be reflected as one or more flicker statistics. For instance, a Fourier Transformation can be carried out to identify frequency components and power levels to determine if flicker is present. As noted below, more advanced waveform analysis may be carried out to determine flicker strength, frequency, and the like. In response to determining the flicker statistics the device can determine what action(s) to take and take appropriate action, such as adjusting the exposure time of the image sensing elements or adjusting other device functionality. For example, based on the flicker characteristics (or lack thereof) the device may determine whether the device is indoors or outdoors and make imaging and/or other adjustments.

Figure 9:
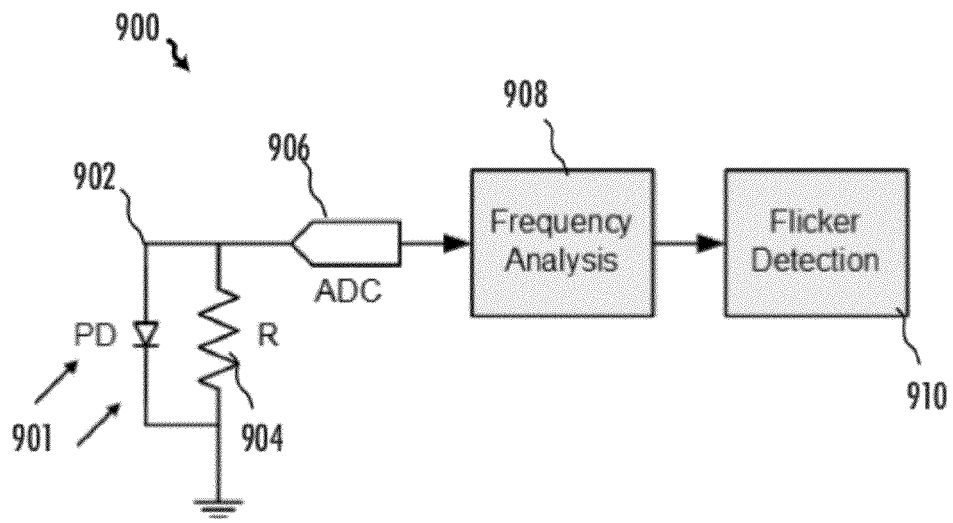
FIG. 9 is a diagram showing details of an illustrative architecture for detecting flicker through use of an illumination element in a device.

FIG. 9 is a diagram showing details of an illustrative architecture 900 for detecting flicker through use of an illumination element in a device acting as a photodiode. In particular, FIG. 9 shows a system with a light emitting diode 902 switched off so as to act as a photodiode (PD) responsive to light 901 from a field of view or light from another location external to the imaging device and indicating characteristics of ambient light.

Diode 902 is connected in parallel with a resistor (R) 904 and low-power, low-data-rate analog-to-digital converter (ADC) 906. In one implementation, the power in frequencies around 100 Hz and 120 Hz can be monitored using a frequency analysis module 908 (e.g., implemented using a processor or other hardware configured to carry out DFT or correlation techniques) and compared with the average illumination power by flicker detection logic module 910 (e.g., implemented using a processor or other hardware) to determine whether substantial flicker exists and if it does, to determine its frequency. The output of the hardware-based flicker detection module can be flicker strength (e.g., flicker modulation depth), flicker frequency, and possibly more elaborate information like the power in the flicker frequencies, spectrum details, and results of waveform analysis.

For example, a logic chip or processor configured to identify flicker and/or flicker statistics (e.g., a chip or processor implementing distortion analysis module 106 or enhancement module 204) can include ADC 906, frequency analysis elements 908, and flicker detection logic module 910 to sample light from an LED and determine whether flicker is present and, if so, one or more characteristics of the flicker. Resistor 904 may be included in the chip as well to minimize the number of components on the PCB.

Of course, the LED may be operated as a sensor even in a device which does not utilize a distorted image. For instance, image processing module 710 of FIG. 7 may correspond to an ISP that operates conventionally but includes ADC 906, frequency analysis component 908, and flicker detection component 910 (and optionally resistor 904), with photocurrent 708 routed to the ISP for processing.

Examples above referred to generating undistorted image data, correcting for the distortion, and correcting for flicker. It will be understood that the "undistorted" image data may have some residual distortion and the process of correcting for distortion and/or correcting for flicker may not completely remove all distortion or flicker. The distorted and/or undistorted image data may represent still images or video data.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, register storage, cache memory, and other memory devices. For example, implementations include (but are not limited to) non-transitory computer-readable media embodying instructions that cause a processor to carry out methods as set forth herein (including, but not limited to, instructions for carrying out methods and variants thereof as discussed with FIGS. 3 and 8), methods as claimed below, and/or operations carried out during the operation of implementations including (but not limited to) the examples discussed with FIGS. 1-2 and FIGS. 7 and 9, including operation of individual modules or other components in those examples.

The present subject matter can be implemented by any computing device that carries out a series of operations based on commands. Such hardware circuitry or elements include general-purpose and special-purpose processors that access instructions stored in a computer-readable medium that cause the processor to carry out operations as discussed herein as well as hardware logic (e.g., field-programmable gate arrays (FPGAs), programmable logic arrays (PLAs), application-specific integrated circuits (ASICs)) configured to carry out operations as discussed herein.

As used herein, the term "and/or" includes any and all combinations of one or more of the associated listed items. Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the present teachings.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Example implementations of the present invention have been disclosed herein and, although specific terms are employed, they are used and are to be interpreted in a generic and descriptive sense only and not for purpose of limitation. While some examples of the present invention have been described relative to a hardware implementation, the processing of present invention may be implemented using software, e.g., by an article of manufacture having a machine-accessible medium including data that, when accessed by a machine, cause the machine to access sensor pixels and otherwise undistorted the data. Accordingly, it will be understood by those of ordinary skill in the art that various changes in form and details may be made without departing from the spirit and scope of the present invention.

What is claimed:

1. A device, comprising:
    an image processing hardware element, the image processing hardware element configured to receive:
        first data representing an image that has undergone a distortion correction, and
        second data representing a flicker statistic,
    the image processing hardware element further configured to correct for image flicker according to the flicker statistic and provide output data based on the first data;
    a distorted image analysis module configured to interface to an array of image sensing elements and to generate the first data by obtaining a distorted image from the array of image sensing elements and, based on a known distortion of the distorted image, correct for the distortion to produce the first data, the distorted image analysis module further configured to provide the second data to the image processing hardware element;
    wherein the distorted image analysis module comprises a processor configured to correct for the distortion by generating a row of pixels of the undistorted image based on identifying pixels spread across multiple rows of the distorted image due to the known distortion.

2. The device of claim 1, further comprising:
    an optical element and a sensor comprising the array of image sensing elements, the sensor connected to the imaging circuit and the optical element introducing the known distortion.

3. The device of claim 2, comprised in a mobile device or a computer.

4. The device of claim 1, wherein the distorted image analysis module is configured to generate the second data by averaging a plurality of pixel values along a line of pixels in the distorted image.

5. The device of claim 1, wherein the distorted image analysis module is configured to generate the second data by dividing the distorted image into a plurality of areas and deriving a flicker statistic for each area.

6. The device of claim 1, wherein the distorted image analysis module is configured to generate the second data by decimating the distorted image according to an intended size of the undistorted image, the intended size different from a size of the distorted image.

7. A device, comprising:
    an image processing hardware element, the image processing hardware element configured to receive:
        first data representing an image that has undergone a distortion correction, and
        second data representing a flicker statistic,
    the image processing hardware element further configured to correct for image flicker according to the flicker statistic and provide output data based on the first data;

wherein the second data are embedded in the first data by a distorted image analysis module that provides the first and second data to the image processing hardware element.

8. The device of claim 7, further comprising:
a distorted image analysis module configured to interface to an array of image sensing elements and to generate the first data by obtaining a distorted image from the array of image sensing elements and, based on a known distortion of the distorted image, correct for the distortion to produce the first data,
the distorted image analysis module further configured to provide the second data to the image processing hardware element.

9. The device of claim 8, wherein the distorted image analysis module comprises a processor configured to correct for the distortion by generating a row of pixels of the undistorted image based on identifying pixels spread across multiple rows of the distorted image due to the known distortion.

10. The device of claim 8, further comprising:
an optical element and a sensor comprising the array of image sensing elements, the sensor connected to the imaging circuit and the optical element introducing the known distortion.

11. The device of claim 10, comprised in a mobile device or a computer.

12. The device of claim 8, wherein the distorted image analysis module is configured to generate the second data by averaging a plurality of pixel values along a line of pixels in the distorted image.

13. The device of claim 8, wherein the distorted image analysis module is configured to generate the second data by dividing the distorted image into a plurality of areas and deriving a flicker statistic for each area.

14. The device of claim 8, wherein the distorted image analysis module is configured to generate the second data by decimating the distorted image according to an intended size of the undistorted image, the intended size different from a size of the distorted image.

15. A device, comprising:
an imaging circuit configured to interface to an array of image sensing elements,
the imaging circuit further configured to, based on output of the array of image sensing elements:
provide first data representing an undistorted image and generated based on a known distortion of an image sensed by the image sensing elements, and
provide second data representing a flicker statistic of the image sensed by the image sensing elements; and
an image processing element configured to receive the first data and the second data and to generate an output image based on the undistorted image, wherein the image processing element is further configured to provide feedback to a sensor comprising the array of image sensing elements, the feedback provided based on the flicker statistic.

16. The device of claim 15, wherein the array of image sensing elements is comprised in a sensor separate from the imaging circuit.

17. The device of claim 15, wherein the array of image sensing elements is comprised in the imaging circuit, the first data representing the undistorted image provided by reading the array of image sensing elements according to the known distortion.

18. A method, comprising:
deriving a flicker statistic from an image having a known distortion; and
generating an undistorted image from the image having the known distortion and providing the undistorted image and the flicker statistic to an image processing element configured to utilize the flicker statistic to correct image flicker;
wherein deriving the flicker statistic comprises:
identifying a line in the image having the known distortion and averaging a plurality of pixel values along the identified line, the line in the image having the known distortion corresponding to a plurality of different lines in the undistorted image.

19. The method of claim 18, further comprising:
providing, by the image processing element, a command to a sensor to correct the image flicker, the command provided based on the flicker statistic.

20. The method of claim 19, further comprising:
creating the image having the known distortion by directing light from a viewing area through a lens to introduce the known distortion and onto a sensor, the image having the known distortion accessible from the sensor and the flicker statistic derived from data generated by the sensor.

21. The method of claim 20,
wherein deriving the flicker statistic is carried out in a first circuit interfaced to the sensor, and
wherein the image processing element comprises a second circuit interfaced to the first circuit.

22. A method, comprising:
deriving a flicker statistic from an image having a known distortion; and
generating an undistorted image from the image having the known distortion and providing the undistorted image and the flicker statistic to an image processing element configured to utilize the flicker statistic to correct image flicker;
wherein deriving the flicker statistic comprises:
dividing the image having the known distortion into a plurality of areas and deriving a flicker statistic for each area.

23. The method of claim 22, further comprising:
providing, by the image processing element, a command to a sensor to correct the image flicker, the command provided based on the flicker statistic.

24. The method of claim 23, further comprising:
creating the image having the known distortion by directing light from a viewing area through a lens to introduce the known distortion and onto a sensor, the image having the known distortion accessible from the sensor and the flicker statistic derived from data generated by the sensor.

25. The method of claim 24,
wherein deriving the flicker statistic is carried out in a first circuit interfaced to the sensor, and
wherein the image processing element comprises a second circuit interfaced to the first circuit.

26. A method, comprising:
deriving a flicker statistic from an image having a known distortion; and
generating an undistorted image from the image having the known distortion and providing the undistorted image and the flicker statistic to an image processing element configured to utilize the flicker statistic to correct image flicker;
wherein deriving the flicker statistic comprises:
decimating the image having the known distortion according to an intended size of an undistorted version of the image, the intended size different from a size of the image having the known distortion.

27. The method of claim 26, further comprising:
providing, by the image processing element, a command to a sensor to correct the image flicker, the command provided based on the flicker statistic.

28. The method of claim 27, further comprising:
creating the image having the known distortion by directing light from a viewing area through a lens to introduce the known distortion and onto a sensor, the image having the known distortion accessible from the sensor and the flicker statistic derived from data generated by the sensor.

29. The method of claim 28,
wherein deriving the flicker statistic is carried out in a first circuit interfaced to the sensor, and
wherein the image processing element comprises a second circuit interfaced to the first circuit.

* * * * *